United States Patent
Barchek et al.

(10) Patent No.: US 9,452,805 B2
(45) Date of Patent: Sep. 27, 2016

(54) FOLDABLE TRICYCLE WITH SEAT ACTUATION

(71) Applicant: Huffy Corporation, Centerville, OH (US)

(72) Inventors: Douglas Barchek, Centerville, OH (US); Jason Jewell, Fairborn, OH (US); Andrew Bean, Cincinnati, OH (US); Donald K. Jessie Jr., Middletown, OH (US)

(73) Assignee: Huffy Corporation, Centerville, OH (US)

( * ) Notice: Subject to any disclaimer, the term of this patent is extended or adjusted under 35 U.S.C. 154(b) by 0 days.

(21) Appl. No.: 13/801,207

(22) Filed: Mar. 13, 2013

(65) Prior Publication Data

US 2014/0097594 A1    Apr. 10, 2014

Related U.S. Application Data

(60) Provisional application No. 61/711,415, filed on Oct. 9, 2012.

(51) Int. Cl.
*B62K 9/02*   (2006.01)
*B62K 15/00*  (2006.01)

(52) U.S. Cl.
CPC ............. *B62K 15/006* (2013.01); *B62K 9/02* (2013.01); *B62K 15/00* (2013.01); *B62K 15/008* (2013.01)

(58) Field of Classification Search
CPC .. B62K 15/00; B62K 15/006; B62K 15/008; B62K 2015/00
USPC .................................................. 280/278, 287
See application file for complete search history.

(56) References Cited

U.S. PATENT DOCUMENTS

| | | | | |
|---|---|---|---|---|
| 2,619,364 | A * | 11/1952 | Carson ........................... | 280/287 |
| 4,026,573 | A * | 5/1977 | Richardson ................... | 280/278 |
| 6,152,473 | A * | 11/2000 | Shih ............................... | 280/278 |
| 6,609,723 | B2 * | 8/2003 | Chuang ......................... | 280/287 |
| 6,935,649 | B2 * | 8/2005 | Lim ............................... | 280/278 |
| 6,966,572 | B2 * | 11/2005 | Michelau et al. ............. | 280/287 |
| 7,300,066 | B2 * | 11/2007 | Kettler et al. ................. | 280/287 |
| 7,658,252 | B2 * | 2/2010 | Shapiro ......................... | 180/208 |
| 7,882,918 | B2 * | 2/2011 | Chin et al. .................... | 180/220 |
| 8,342,555 | B2 * | 1/2013 | Ball et al. ..................... | 280/278 |
| 2003/0141695 | A1 * | 7/2003 | Chen ............................. | 280/287 |
| 2008/0277901 | A1 * | 11/2008 | Catelli et al. ................. | 280/287 |

* cited by examiner

*Primary Examiner* — Joseph Rocca
*Assistant Examiner* — Marc A Scharich
(74) *Attorney, Agent, or Firm* — Wood, Herron & Evans, LLP (57) ABSTRACT

A foldable tricycle includes a first frame, a second frame movably coupled to the first frame, and a seat for supporting a rider, wherein the seat operates as an actuator for moving the first and second frames relative to each other. Additionally, a method of handling a foldable tricycle movable between a first position and a second position includes applying a force to the seat of the tricycle, wherein the applied force on the seat causes the tricycle to move from the first position to the second position.

5 Claims, 12 Drawing Sheets

FOLDABLE TRICYCLE WITH SEAT ACTUATION

CROSS-REFERENCE TO RELATED APPLICATION

This application claims priority to U.S. Provisional Patent Application Ser. No. 61/711,415 filed Oct. 9, 2012, the disclosure of which is incorporated by reference herein in its entirety.

TECHNICAL FIELD

The invention relates to a foldable tricycle, and more particularly to a foldable tricycle having an extended, in-use position and a folded, storage position, and a seat operating as an actuator for transitioning the tricycle between the two positions.

BACKGROUND

Many manufacturers, retailers and consumers find certain benefits in foldable tricycles. Many foldable tricycles have multiple positions including, for example, an extended position and a folded position. When in the extended position, the tricycle is configured to be mounted by a rider and used for its intended purpose, such as being ridden along a street, sidewalk or the like. However, when in the extended position, the tricycle may have a footprint (e.g., size) that may not be conducive for efficient storage, transport or the like. Accordingly, the foldable tricycle may include a folded position wherein the tricycle has a compact configuration with a reduced footprint as compared to its extended position. Manufacturers may find a reduced product footprint advantageous in regard to packaging and shipping the tricycles to retailers or consumers. For example, smaller boxes or the like may be used in packaging the tricycles, resulting in lower costs. Similarly, more efficient packaging may be achieved, such as a packaging unit (e.g., box or the like) holding an increased number of tricycles. Furthermore, retailers may find a reduced product footprint advantageous in regard to using retail floor space in a more efficient manner. For example, more product may be provided or displayed in a fixed amount of retail space. Alternatively, less retail space may be utilized for a fixed number of product units, thereby allowing a greater variety of products to be offered in a retail space. Moreover, consumers may find a reduced product footprint advantageous in regard to storing the tricycle in the garage, shed, basement or the like, where space is often at a premium.

While there are certain benefits to foldable tricycles, there may also be some drawbacks. For example, when there are movable parts in a product, design considerations generally include minimizing the potential for pinch points. For foldable tricycles, this concern generally focuses around the pivot point or pivot mechanism of the tricycle, i.e., the point about which the tricycle folds. In this regard, many pivot mechanisms are actuated so as to allow the tricycle to fold by pressing, pulling or otherwise manipulating a button, lever or the like on or in the immediate vicinity of the pivot mechanism, thus bringing a portion of a user (e.g., one's hands or fingers) closer to the relative moving parts. Additionally, the button, lever or other actuator may be relatively small in size and therefore difficult for an adult, such as a parent or guardian, to actuate.

In addition, when in the folded position, such as when on display in retail stores or stowed in the garage, foldable tricycles are typically not ridable and it may be undesirable to have a rider attempt to mount the tricycle when in the folded position. Thus, parents, guardians, retail workers or the like generally discourage potential riders from attempting to mount the tricycles when in the folded position. Instead, when a rider wants to mount the tricycle, the parent, guardian, retail worker or the like, must first manipulate the tricycle so as to transition the tricycle from the folded position to the extended position. This may frustrate some consumers and potential riders who may prefer immediate access to the tricycle.

Accordingly, there is a need for a foldable tricycle capable of being moved between its extended position and its folded position in a manner that keeps ones hands, fingers, etc. more remote from the pivot point or pivot mechanism and through manipulation of larger actuators for achieving the transition therebetween. There is also a need for a foldable tricycle that reduces concerns with potential riders attempting to mount the tricycle when in its folded position.

SUMMARY

A foldable tricycle includes a first frame, a second frame movably coupled to the first frame, and a seat for supporting a rider, wherein the seat operates as an actuator for moving the first and second frames relative to each other. In one embodiment, the second frame is pivotally coupled to the first frame and the seat operates as an actuator for pivoting the first and second frames relative to each other. The tricycle may include a seat assembly comprising the seat and a mount coupled to the seat. The seat assembly may be pivotally coupled to the first frame in one embodiment. In this embodiment, rotation of the seat assembly relative to the first frame in a first rotational direction causes rotation of the second frame relative to the first frame in a second rotational direction opposite to the first rotational direction.

In an exemplary embodiment, the second frame is movable relative to the first frame between a first position and a second position, wherein actuation of the seat causes the tricycle to transition between the first and second positions. When the tricycle is in the first position, the seat has a first orientation, and when the tricycle is in the second position, the seat has a second orientation, wherein the first and second orientations are different. When the seat is in the first orientation, the seat is not configured to support a rider thereon. More particularly, when the seat is in the first orientation, the seat is angled relative to horizontal to discourage a rider from sitting on the seat.

In a further embodiment, the tricycle may include a locking mechanism configured to fix the relative positioning of the first and second frames. In one embodiment, the locking mechanism may be configured to fix the relative position of the first and second frames when in the second position. The locking mechanism may be further configured to fix the relative position of the first and second frames when in the first position. In an exemplary embodiment, the locking mechanism may include a spring loaded pin associated with the first frame and a recess configured to receive the spring loaded pin associated with the seat assembly.

In another embodiment, a foldable tricycle includes a first frame having a steering assembly with a front wheel and a handlebar, a second frame having a pair of rear wheels, a seat assembly having a seat and a mount, a first pivot mechanism coupled to the first and second frames to provide pivotal movement between an extended position and a folded position, and a second pivot mechanism coupled to the first frame and the seat assembly to provide pivotal movement therebetween, wherein pivotal movement of the seat assembly causes pivotal movement of the first and second frames from the folded position to the extended position.

In yet another embodiment, a method of handling a foldable tricycle movable between a first position and a second position includes applying a force to the seat of the tricycle, wherein the applied force on the seat causes the tricycle to move from the first position to the second position. In one embodiment, applying a force to the seat further comprises attempting to sit on the seat. The method may further comprise automatically moving the tricycle from the first position to the second position upon attempting to sit in the seat when the tricycle is in the first position. For example, the method may include using the weight of the rider to automatically move the tricycle from the first position to the second position.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
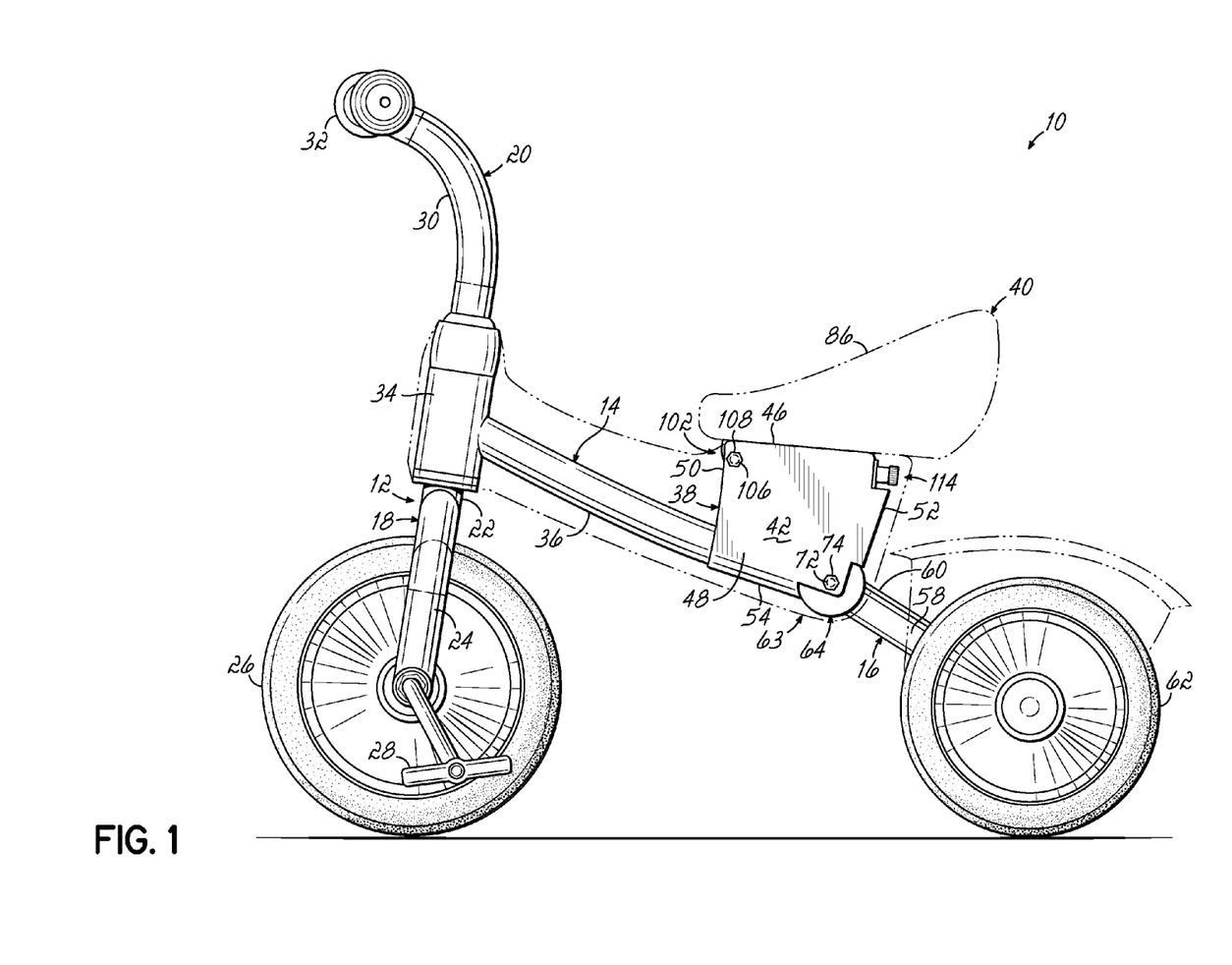
FIG. 1 is a side plan view of a tricycle in an extended, in-use position.
Figure 2:
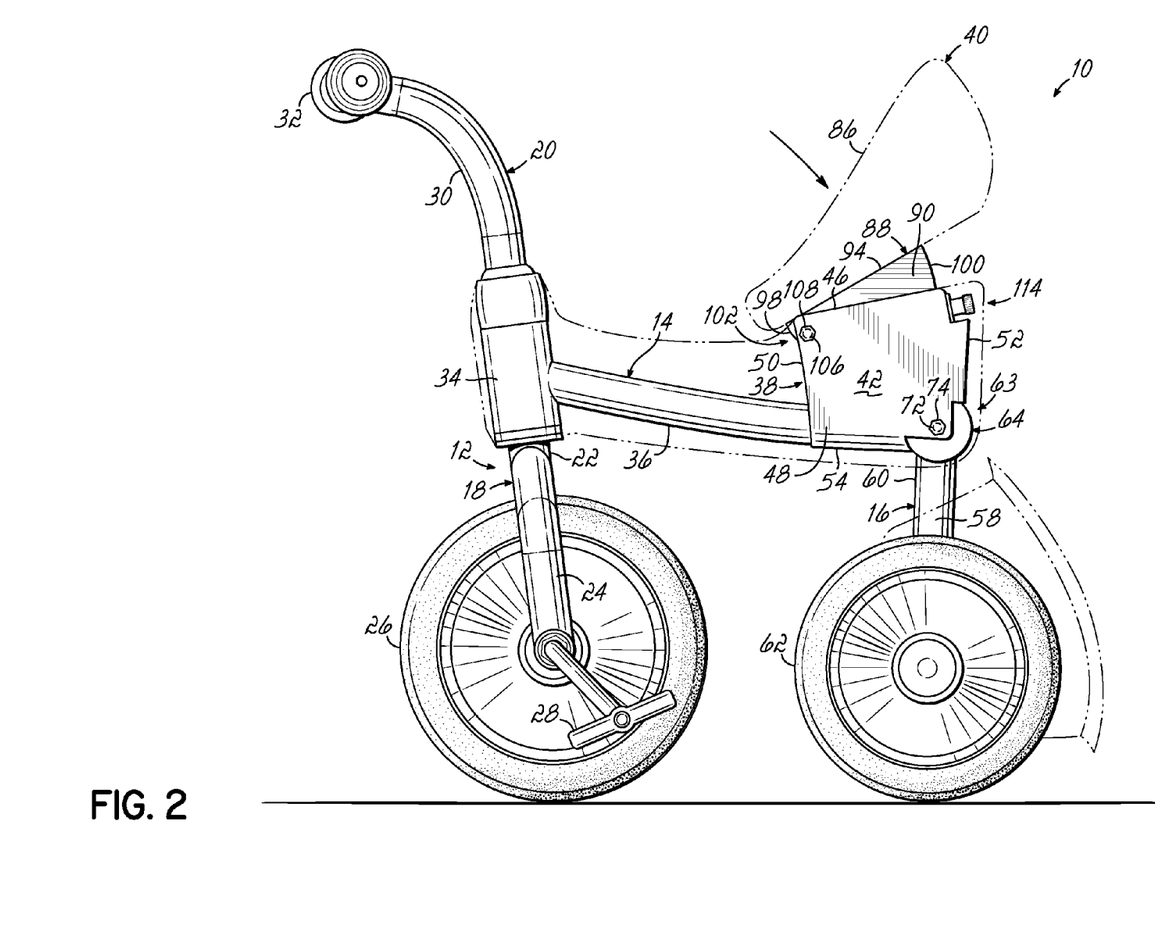
FIG. 2 is a side plan view of the tricycle of FIG. 1 in a folded, storage position.

Referring now to the drawings and to FIGS. 1 and 2 in particular, a vehicle 10 (more specifically, a tricycle 10) in accordance with an exemplary embodiment of the invention is shown. The tricycle 10 includes a front frame 12, a middle frame 14, and a rear frame 16. The front frame 12 includes a front fork 18 operatively coupled to a handlebar 20. The front fork 18 includes a fork stem 22 and a pair of spaced apart forks or legs 24 extending therefrom in a generally parallel fashion. A front wheel 26, which defines a front axle, is positioned between the legs 24 and rotatably coupled thereto so as to allow rotation of the front wheel 26 relative to the front frame 12. A pair of pedals 28 are positioned outboard of the legs 24 of front fork 18 and are operatively coupled to the front wheel 26 (e.g., such as by being coupled to the front axle) for allowing the rider to rotate the front wheel 26, and consequently, propel the tricycle 10 in a certain direction dictated by handlebar 20.

The handlebar 20 includes a handlebar stem 30 configured to be coupled to the fork stem 22, and a pair of handles 32 configured to be grasped by the rider for turning the tricycle 10 in a desired direction. The handles 32 may include grips or other features that facilitate gripping by the user. Those of ordinary skill in the art will recognize that the handlebar 20 may have a wide variety of shapes and designs and the invention is not limited to the particular embodiment shown herein.

The middle frame 14 includes a head tube 34 configured to be coupled to the front frame 12, one or more frame support elements 36 (one shown in the illustrated embodiment), and a seat actuation mechanism 38 coupled to at least one of the frame support elements 36 and configured to be movably coupled to rear frame 16 and a seat assembly 40. The front frame 12, and more particularly at least one of the fork stem 22 and handlebar stem 30, is configured to be inserted through the head tube 34 and rotatably mounted thereto so as to allow the front frame 12 to rotate relative to the middle frame 14, and thereby change the direction of the tricycle 10 through the rotation of handlebar 20. In a similar manner, and as discussed in more detail below, the seat actuation mechanism 38 is configured to couple to the rear frame 16 so that the middle frame 14 and rear frame 16 are pivotal relative to each other about a pivot axis. Thus, in a preferred embodiment, the tricycle 10 is foldable. The seat actuation mechanism 38 is further configured to couple to the seat assembly 40 so that the seat assembly 40 and middle frame 14 are pivotal relative to each other about another pivot axis.

In an exemplary embodiment, the seat actuation mechanism 38 includes a first plate member 42 and second plate member 44 in aligned, but spaced relation to each other. In one embodiment, the first and second plate members 42, 44 may be generally rectangular in shape and include an upper end 46, a lower end 48, a front end 50 and a rear end 52. While the plate members 42, 44 are described as being generally rectangular, other shapes are also possible and the invention is not limited to the particular shape shown. A lower end wall 54 may connect the lower ends 48 of the plate members 42, 44 and may be generally arcuate to as to wrap about a frame support element 36 of the middle frame 14.

The plate members 42, 44 and/or the lower end wall 54 may be fixedly secured to the middle frame 14, such as at support element 36. This coupling may be achieved, for example, by welding or other suitable process. In any event, the seat actuation mechanism 38 generally couples to the middle frame 14 at a lower end of the seat actuation mechanism. One or more walls may also extend between plate members 42, 44 at other ends of the seat actuation mechanism 38. For example, in one embodiment, a rear end wall 56 may extend between first and second plate members 42, 44 at the rear end 52 of seat actuation mechanism 38. The purpose of this rear end wall 56 will be made clear below. In addition to that purpose, the rear end wall 56 may also restrict access to the interior of the seat actuation mechanism 38 thereby minimizing potential pinch points. However, and in an alternative embodiment, the tricycle 10 may include a shell or manifold (shown in phantom) generally positioned about the middle frame 14 to enclose much of the seat actuation mechanism 38, as well as to provide an aesthetic aspect to the tricycle 10. In such an alternative embodiment, the rear end wall 56 (or a significant portion thereof) may be omitted.

In an exemplary embodiment, the rear frame 16 includes one or more frame support elements 58 having a middle portion 60 and end portions spaced from each other on either side of middle portion 60. The middle portion 60 is configured to be coupled to the middle frame 14, as is explained in more detail below. Moreover, each end portion includes a rear wheel 62 rotatably coupled adjacent an end thereof so as to allow rotation of the rear wheels 62 relative to the rear frame 16. The rear frame 16 may have a number of configurations. For example, in one embodiment, the rear frame 16 may include a first frame member extending from the seat actuation mechanism 38 and a second frame member coupled to the first frame member at a T-joint. The second frame member may be straight or curved (e.g., U-shaped), for example, and the rear wheels 62 may be coupled adjacent the ends of the second frame member. The particular U-shaped configuration of rear frame 16 defines an open region generally between the two rear wheels 62 which is openly accessible from the rear of the tricycle 10. A basket or the like (shown in phantom) may be disposed between the two rear wheels 62 in one embodiment. This arrangement, however, is merely exemplary and other configurations exist, as recognized by those of ordinary skill in the art.

In one aspect in accordance with an embodiment of the invention, and as noted above, the coupling between the middle frame 14 and the rear frame 16 is configured as a swivel or pivot joint 63. Such a pivot joint 63 between the middle and rear frames 14, 16 allows the tricycle 10 to be convertible between multiple configurations. By way of example, the pivot joint 63 permits the tricycle 10 to transition between an extended position, illustrated, for example, in FIG. 1, and a folded position, illustrated, for example, in FIG. 2.

To this end, the middle portion 60 of the rear frame 16 includes a connecting element configured to facilitate rotation of the rear frame 16 relative to the middle frame 14. In an exemplary embodiment, the connecting element may be configured as a generally cylindrical disc 64 having, for example, generally circular end faces 66 connected by a side wall 68. A bore 70 extends through the cylindrical disc 64 generally at its center. The seat actuation mechanism 38 includes a pair of aligned bores 72 through each of the plate members 42, 44. In an exemplary embodiment, the bores 72 are located adjacent an intersection of the lower end 48 and the rear end 52 of the plate members 42, 44. The end walls 54, 56 do not extend the full length of their respective ends, but stop short of the region of the bores 72 so as to create an opening between the two plate members 42, 44. The opening is configured such that the cylindrical disc 64 may be received between the two plate members 42, 44 such that the bore 70 through the disc 64 may be generally aligned with the bores 72 in the plate members 42, 44. When so aligned, a connecting pin 74 (e.g., nut and bolt, rivet, etc.) may be inserted through the bores 70, 72 so as to pivotally couple the middle and rear frames 14, 16. In this regard, the connecting pin 74 defines a pivot axis about which the middle and rear frames 14, 16 rotate as the tricycle 10 is being transitioned between the extended and folded positions.

Figure 3:
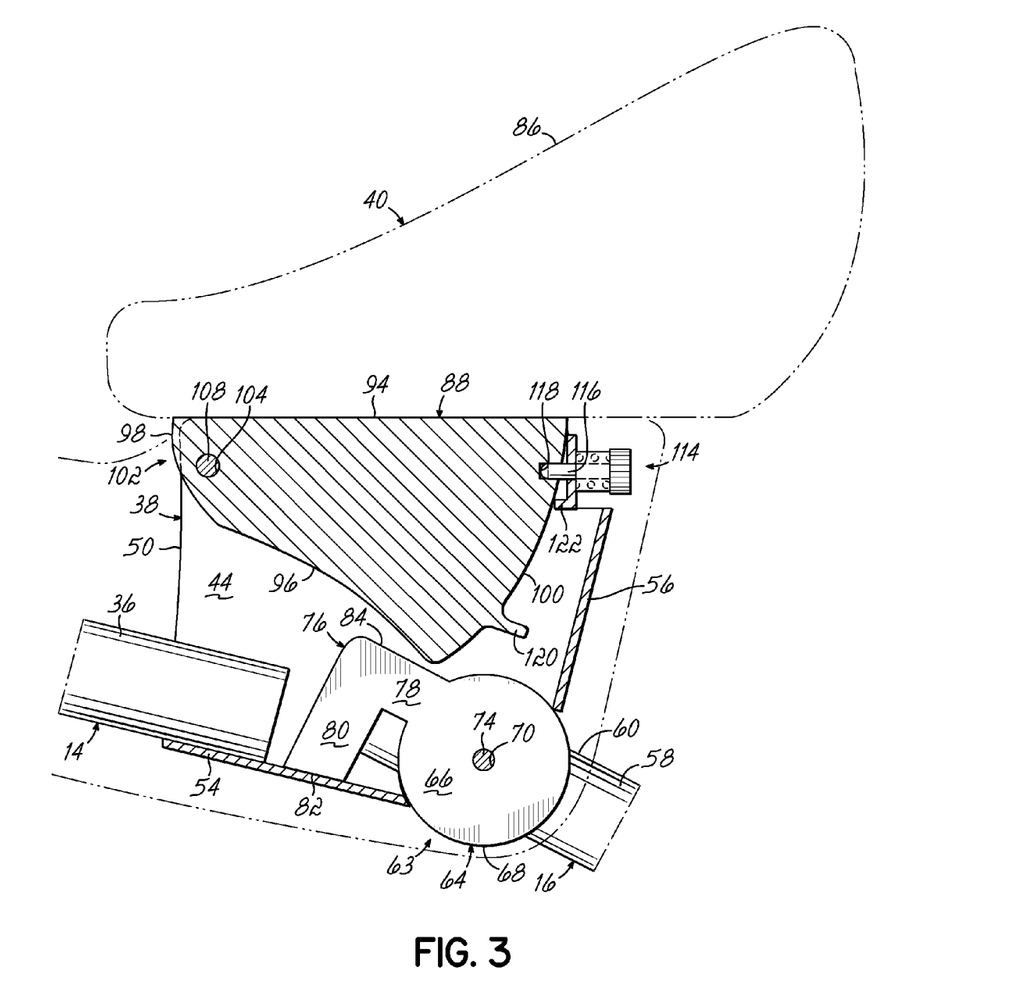
FIG. 3 is a partial cross-sectional view of the seat actuation mechanism of the tricycle of FIG. 1 when in the extended position.
Figure 4:
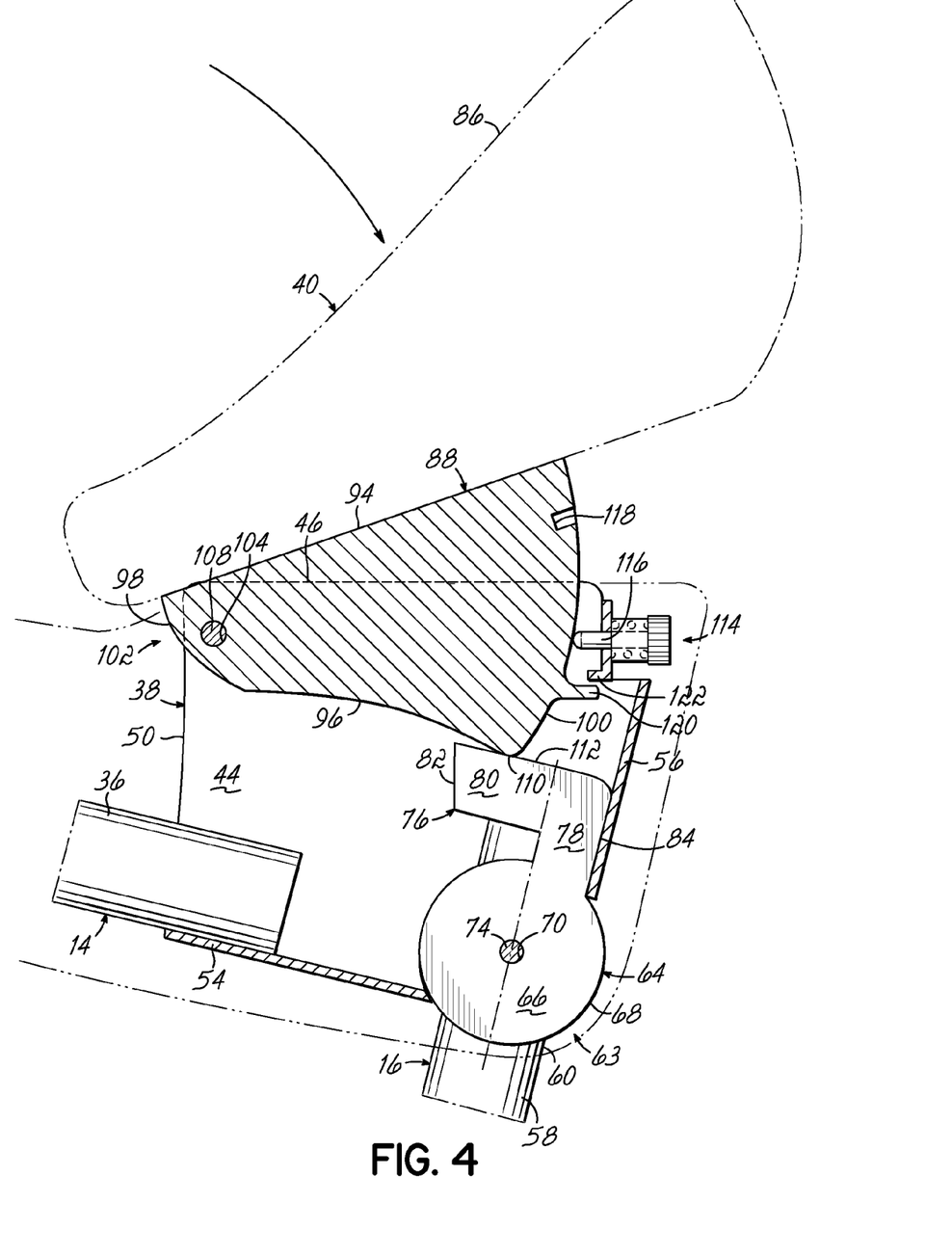
FIG. 4 is a partial cross-sectional view of the seat actuation mechanism of the tricycle of FIG. 2 when in the folded position.

The tricycle 10, and more particularly the pivot joint 63, may include a limit mechanism that limits the relative rotation between the two frame members 14, 16 to a certain range (e.g., for example, slightly less than about 90 degrees). The bounds of that range may define the extended and folded positions of the tricycle 10. In an exemplary embodiment, the limit mechanism includes an interaction between a portion of the rear frame 16 and the seat actuation mechanism 38. More particularly, and as illustrated in FIGS. 3 and 4, the cylindrical disc 64 includes an extension portion 76 which extends away from the cylindrical disc 64 and is configured to interact with the seat actuation mechanism 38 to limit the relative rotation between the two frames 14, 16. In one embodiment, the extension portion 76 may be generally L-shaped having a first leg 78 coupled to the cylindrical disc 64 and extending away therefrom in a direction generally opposite to the middle portion 60, and a second leg 80 coupled to an end of the first leg and extending therefrom in a generally perpendicular manner, although other angles may be possible depending on the specific application.

As illustrated in FIG. 3, when the tricycle 10 is in the extended position, a first abutment surface 82 defined by the end of the second leg 80 of the extension portion 76 contacts an inner surface of the lower end wall 54 such that any further rotation of the rear frame 16 relative to the middle frame 14 about the pivot axis in the counterclockwise direction is prohibited. Similarly, as illustrated in FIG. 4, when the tricycle 10 is in the folded position, a second abutment surface 84 defined by the extension portion 76 contacts an inner surface of the rear end wall 56 such that any further rotation of the rear frame 16 relative to the middle frame 14 about the pivot axis in the clockwise direction is prohibited. Thus, in one embodiment the relative rotation between the middle and rear frames 14, 16 is limited by contact between the extension portion 76 and the lower and rear end walls 54, 56. Indeed, the point of contact between the extension portion 76 and the end walls 54, 56 may define the extended and folded positions.

In one aspect in accordance with an embodiment of the invention, the tricycle 10 may be transitioned at least between the folded position (FIG. 2) and the extended position (FIG. 1) using the seat assembly 40 as an actuator. In an exemplary embodiment, the seat assembly 40 includes a seat 86 and a mount 88 coupled to the underside of the seat 86 for mounting the seat 86 to the tricycle 10. In an exemplary embodiment, the mount 88 may be configured as a solid plate member and generally includes side walls 90, an upper wall 94, a lower wall 96, a front wall 98, and a rear wall 100. The upper wall 94 may be coupled to the underside of the seat 86 through a suitable process as recognized by one of ordinary skill in the art. Additionally, the rear wall 100 and possibly a portion of the lower wall 96 may be generally arcuate, although not so limited. While the mount 88 is described herein as being generally solid, in alternative embodiments, the mount may be hollow or formed from separate walls coupled together, for example, along their common edges.

In another aspect in accordance with an embodiment of the invention, the coupling between the middle frame 14 and the seat assembly 40 is configured as a pivot joint 102. Such a pivot joint 102 between the middle frame 14 and the seat assembly 40 allows the seat 86 to be used as an actuator for transitioning the tricycle 10 at least between the folded and extended positions. To this end, the mount 88 includes a bore 104 that extends between the side walls 90. In an exemplary embodiment, the bore 104 may be located adjacent the front wall 98. Additionally, the seat actuation mechanism 38 includes a bore 106 through each of the plate members 42, 44. In an exemplary embodiment, the bores 106 are located adjacent an intersection of the upper end 46 and the front end 50 of the plate members 42, 44. The mount 44 is generally sized so as to fit between the first and second plate members 42, 44 of the seat actuation mechanism 38 along the upper end 46 thereof such that bore 104 through the mount 88 may be generally aligned with the bores 106 in the plate members 42, 44. When so aligned, a connecting pin 108 may be inserted through the bores 104, 106 so as to pivotally couple the middle frame 14 and the seat assembly 40 via a pivot axis defined by the connecting pin 108.

In accordance with an aspect of the invention, the seat 86 may be used as an actuator for transitioning the tricycle 10 at least between the folded and extended positions. In this regard, the seat assembly 40 may be configured to interact with the pivot joint 63 between the middle and rear frames 14, 16 in a manner that achieves such actuation. For sake of discussion, the folded position of the tricycle 10, as illustrated in FIGS. 2 and 4, will be taken as the initial position of the tricycle 10. When it is desired to transition the tricycle 10 from the folded position to the extended position, a person, such as an adult, guardian, retail worker or the like, may set the tricycle 10 on the ground and apply a force to the seat 86 in a generally downward direction, as illustrated by the arrows in FIGS. 2 and 4 (e.g., generally perpendicular to the seat 86 when in the folded configuration). This force causes the seat assembly 40 to rotate about the pivot pin 108 in the clockwise direction. As illustrated in FIG. 4, a contacting surface 110 of the mount 88 engages a surface 112 of the extension portion 76 such that a clockwise rotation of the seat assembly 40 relative to seat actuation mechanism 38 causes a counterclockwise rotation of the rear frame 16 relative to the seat actuation mechanism 38 about pivot pin 74, thus causing the rear frame 16 to move relative to the middle frame 14 from the folded position to the extended position. When in the extended position, as illustrated in FIG. 3, the first abutment surface 82 contacts the inner surface of the lower end wall 54 and the seat 86 is in its proper orientation for use of the tricycle 10. Additionally, the contact surface 110 remains in contact or near contact with the extension portion 76 to discourage movement of the rear frame away from the extended position (e.g., due to weight of the rider).

Moreover, the tricycle 10 may include a lock mechanism, generally shown at 114, to lock or resist relative movement between the middle and rear frames 14, 16 when in the extended position. In an exemplary embodiment, the lock mechanism 114 may include a spring loaded pin 116 coupled to the seat actuation mechanism 38. For example, the spring loaded pin 116 may be positioned on the rear end wall 56 of the seat actuation mechanism 38 such that the pin 116 projects into the interior of the seat actuation mechanism 38. The lock mechanism 114 may further include a cavity or recess 118 associated with the seat assembly 40, and more particularly, the mount 88. For example, the recess 118 may be located in the rear end wall 100 of the mount 88.

As mentioned above, the rear wall 100 may be generally arcuate such that as the seat assembly 40 is rotated in the clockwise direction, the pin 116 engages the rear wall 100 and becomes depressed by the rear wall 100 until the pin reaches the recess 118, whereat the pin 116 snaps into the recess 118 under the spring bias to thereby lock the tricycle 10 in the extended position. As noted above, when in the extended position, the rear frame 16 is substantially prevented from rotating relative to the middle frame 14 in the counterclockwise direction due to contact between the first abutment surface 82 and the inner surface of lower end wall 54 (see FIG. 3). If one attempted to rotate the rear frame 16 relative to the middle frame 14 in the clockwise direction, the extension portion 76 would engage (or would already be engaging) the mount 88 of the seat assembly 40 and thereby attempt to rotate the seat assembly 40 in the counterclockwise direction. This rotation, however, would be resisted by the presence of the pin 116 in the recess 118. Accordingly, the tricycle 10 would be locked in the extended position and movement of the tricycle 10 toward the folded position would be resisted.

When it is desired to transition the tricycle 10 from the extended position to the folded position, a person, such as an adult or the like, may reach behind the seat 86 and pull the spring loaded pin 116 so as to release the pin from the recess 118. This then allows the seat assembly 40 to be rotated in the counterclockwise direction. This, in turn, allows the rear frame 16 to be rotated relative to the middle frame 14 in the clockwise direction and toward the folded position. To achieve the rotation of the rear frame 16 relative to the middle frame 14 from the extended position toward the folded position, the person may lift the tricycle 10 vertically so that gravity assists with the clockwise rotation of the rear frame 16. Additionally or alternatively, the person may use his or her foot or hand, for example, to rotate the rear frame 16 in the clockwise direction once the spring pin 116 is released from recess 118.

The tricycle 10, and more particularly the pivot joint 102, may include a limit mechanism that limits the relative rotation between the middle frame 14 and the seat assembly 40. In an exemplary embodiment, the limit mechanism includes an interaction between a portion of the seat assembly 40 and the seat actuation mechanism 38. More specifically, as the seat assembly 40 is rotated in a clockwise direction relative to the seat actuation mechanism 38, the locking pin 116 is configured to engage the recess 118 to limit further clockwise rotation of the seat assembly 40. Additionally, contact between the mount 88 and the extension portion 76 would also limit further clockwise rotation of the seat assembly 40. Moreover, as the seat assembly 40 is rotated in a counterclockwise direction relative to the seat actuation mechanism 38, one or more rearward extending tabs 120 on the rear wall 100 of the mount 88 is configured to engage a ledge 122 of the seat actuation mechanism 38 to prevent further counterclockwise rotation of the seat assembly 40.

In one embodiment, the extension portion 76, and more particularly, the second abutment surface 84, is configured to contact the inner surface of the rear end wall 56 simultaneous with or prior to the tab 120 contacting the ledge 122. If the contact of the extension portion 76 and rear end wall 56 is prior to the tab/ledge engagement, then the seat assembly 40 could potentially continue to rotate in the counterclockwise direction relative to the seat actuation mechanism 38 even after the extension portion 76 contacts the rear end wall 56. At some point, however, the tab 120 is configured to engage the ledge 122 so as to restrict further counterclockwise rotation of the seat assembly 40 relative to the seat actuation mechanism 38. Thus, the seat assembly 40 cannot be flipped out of the seat actuation mechanism 38.

In an alternative embodiment, however, the tab 120 may be configured to contact the ledge 122 prior to the extension portion 76 contacting the rear end wall 56. In this case, the mechanism that limits the relative rotation between the middle and rear frames 14, 16, respectively, is dictated by the engagement of the tab 120 with the ledge 122. More particularly, as the tricycle 10 is moved toward the folded position, the tab 120 will engage the ledge 122 such that any further rotation of the rear frame 16 relative to the middle frame 14 about the pivot axis in the clockwise direction would be prohibited. Thus, the relative rotation between the middle and rear frames 14, 16 is limited by contact between the tab 120 on the seat assembly 40 and the ledge 122 on the seat actuation mechanism 38.

The foldable tricycle 10 as described herein has a number of benefits as compared to conventional folding tricycles. In this regard, through the seat actuation mechanism 38, the tricycle 10 may be transitioned at least between the folded position and the extended position by applying a sufficient force to the seat 86. As compared to more conventional folding tricycles, the seat 86 is removed from the pivot mechanism 63 between the folding frames 14, 16 of the tricycle 10. Accordingly, the likelihood of having a hand, finger, etc. pinched during the transition is reduced. Moreover, the seat 86 is a relatively large target for adults to grab and manipulate. Thus, it is believed that transitioning the tricycle 10 should be easier and more convenient, increasing overall customer satisfaction.

The foldable tricycle 10 also provides benefits in regard to those potential riders that attempt to mount the tricycle while the tricycle is in the folded position. In the first instance, and as illustrated in FIG. 2, when in the folded position, the seat 86 has an orientation that discourages potential riders from mounting the tricycle 10. For example, as shown, when in the folded position, the seat 86 may be angled forward by a certain amount. By way of example, the seat 86 may be angled between about 20 degrees and about 60 degrees. Other angles may also be possible. The angling of the seat 86 is enough such that a potential rider can readily recognize that the tricycle 10 is not ready for riding. The visual appearance of the seat 86 then discourages the potential rider from mounting the tricycle 10.

However, for those potential riders that persist in attempting to mount the tricycle 10 when in the folded position, tricycle 10 provides an additional benefit. In this regard, should a potential rider try to sit in the seat 86, the potential rider will effectively be applying a downward force on the seat 86, thereby causing the tricycle 10 to transition from the folded position to the extended position through the act of sitting on the seat 86. Thus, the tricycle 10 is configured to automatically transition from the folded position to the extended position when a potential rider mounts the tricycle 10 and sits in the seat 86. Of course in the extended position, the tricycle 10 may support the rider as intended during normal use of the tricycle.

Figure 5:
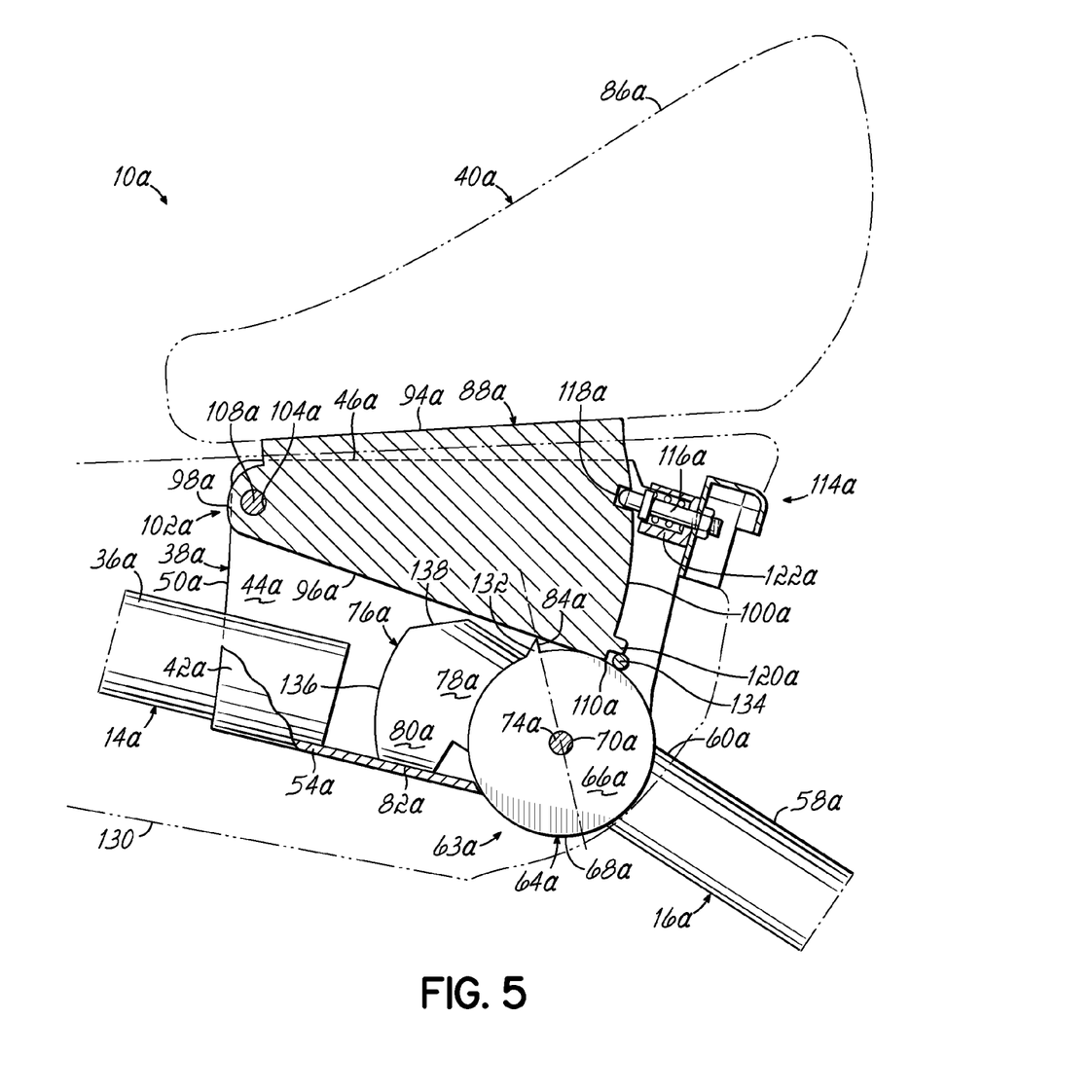
FIG. 5 is a partial cross-sectional view of a seat actuation mechanism of a tricycle when in the extended position according to an alternative embodiment.
Figure 6:
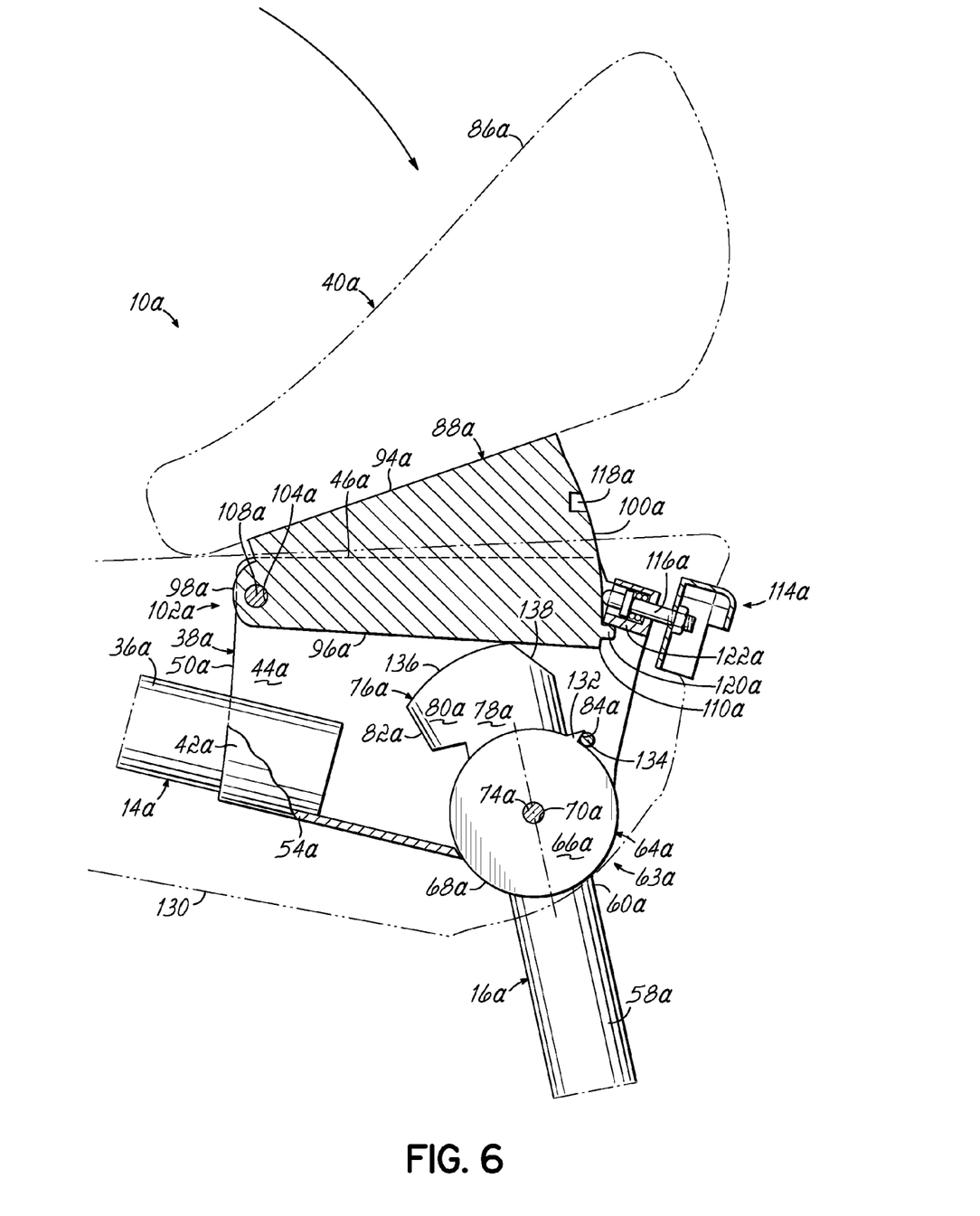
FIG. 6 is a partial cross-sectional view of the seat actuation mechanism of the tricycle of FIG. 5 when in the folded position.

FIGS. 5 and 6 illustrate a vehicle 10*a*, and more specifically a tricycle 10*a*, in accordance with an alternative embodiment. The embodiment shown in FIGS. 5 and 6 operates similar to that shown in FIGS. 1-4 and thus the description will primarily focus on the differences in the two embodiments. In FIGS. 5 and 6 features similar to that shown in FIGS. 1-4 have been identified with similar reference numbers, but suffixed with an a. As shown in these figures, tricycle 10*a* includes a manifold 130 generally disposed about the middle frame 14*a* that encloses much of the seat actuation mechanism 38*a*. The manifold 130 is configured to not only enclose the seat actuation mechanism 38*a*, but also provide an improved aesthetic aspect to the tricycle 10*a*.

One primary difference between this embodiment and the prior embodiment includes the limit mechanism that limits relative rotation between the middle and rear frame members 14*a*, 16*a*. In the prior embodiment, the extension portion 76 engaged the inner surface of the lower end wall 54 to limit the rotation of the rear frame 16*a* relative to the middle frame 14*a* in the counterclockwise direction, and engaged the inner surface of the rear end wall 56*a* to limit rotation of the rear frame 16*a* relative to the middle frame 14*a* in the clockwise direction. In the embodiment shown in FIGS. 5 and 6, the first abutment surface 82*a* defined by the end of the second leg portion 80*a* of the extension portion 76*a* contacts the inner surface of the lower end wall 54*a* such that any further rotation of the rear frame 16*a* relative to the middle frame 14*a* about the pivot axis in the counterclockwise direction is prohibited. However, when the tricycle 10*a* is in the folded position, another mechanism limits the relative movement. In this regard, and as illustrated in FIG. 6, the cylindrical disc 64*a*, and more particularly the side wall 68*a* thereof, includes a projection in the form of a generally triangular wedge 132 that defines a second abutment surface 84*a*. Additionally, the seat actuation mechanism 38*a* includes a pin 134 received within aligned bores in the plate members 42*a*, 44*a*. When the tricycle 10*a* is in the folded position, the second abutment surface 84*a* defined by the triangular wedge 132 of the extension portion 76*a* contacts the pin 134 such that any further rotation of the rear frame 16*a* relative to the middle frame 14*a* about the pivot axis in the clockwise direction is prohibited.

Another difference is that the shape of the extension portion 76*a* may be slightly different to achieve the desired behavior between the seat assembly 40*a* and the rear frame 16*a*. For example, as illustrated in these figures, the outer surface of the extension portion 76*a* may be shaped to facilitate engagement with the mount 88*a* of the seat assembly 40*a*. More particularly, an outer surface portion 136 may be generally arcuate, and the extension portion 76*a* may include a chamfer or cut out 138. Additionally, the lower wall 96*a* of the mount 88*a* may be generally planar instead of arcuate to ensure proper cooperation between the seat assembly 40*a* and the rear frame 16*a*. Similar to the previous embodiment, there may be an additional limit mechanism to limit the relative rotation between the middle frame 14*a* and the seat assembly 40*a*. In this regard, the mount 88*a* of the seat assembly 40*a* may include one or more tabs 120*a* extending from the rear wall 100*a* thereof and configured to engage a ledge 122*a* of the seat actuation mechanism 38*a* to limit counterclockwise rotation of the seat assembly 40*a* relative to the middle frame 14*a*. The ledge 122*a* may also be associated with the manifold 130 instead of the seat actuation mechanism 38*a*. In any event, in an exemplary embodiment, the second abutment surface 84*a* of the wedge 132 is configured to engage the pin 134 simultaneous with or prior to the tabs 120*a* engaging the ledge 122*a*.

Figure 7:
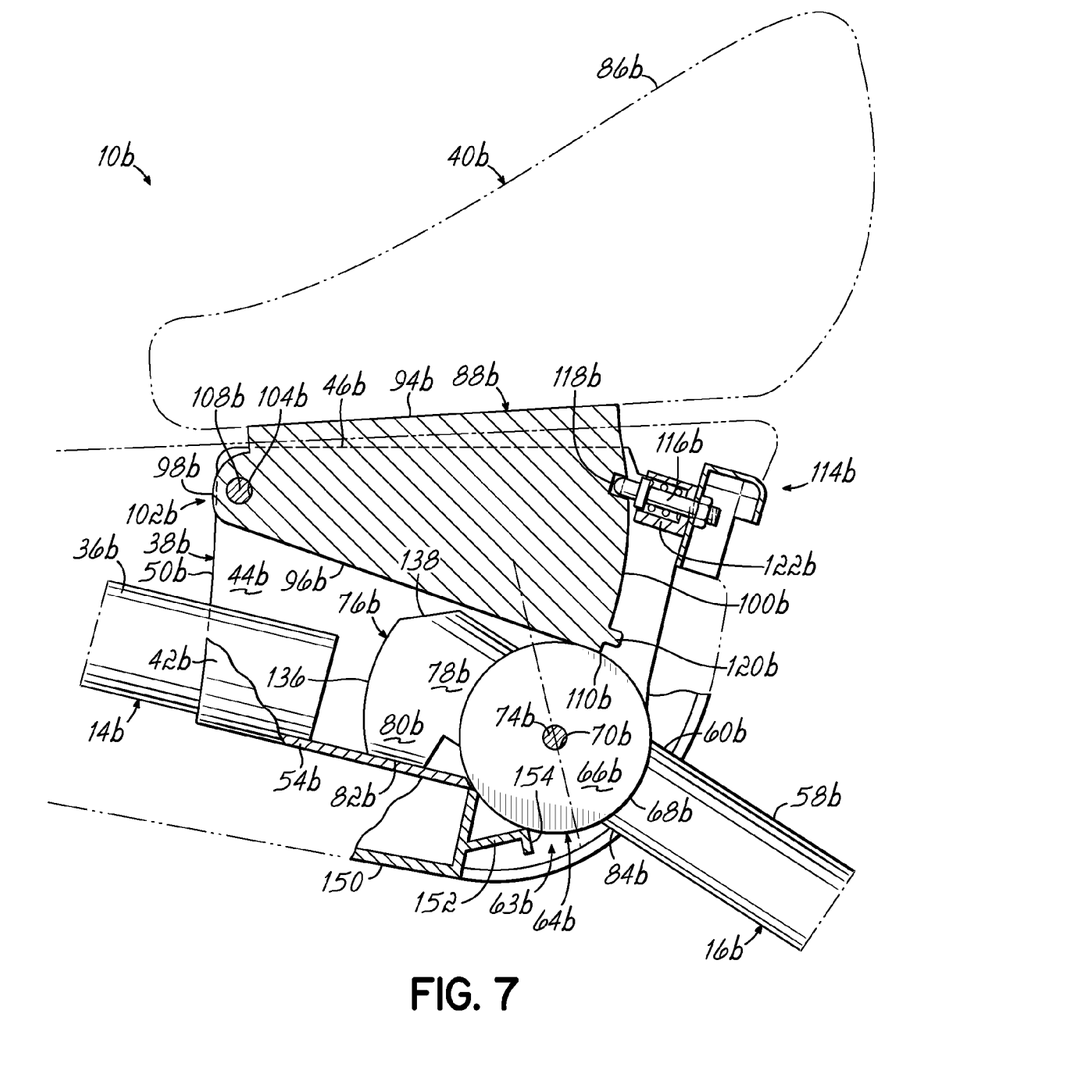
FIG. 7 is a partial cross-sectional view of a seat actuation mechanism of a when in the extended position according to another alternative embodiment.
Figure 8:
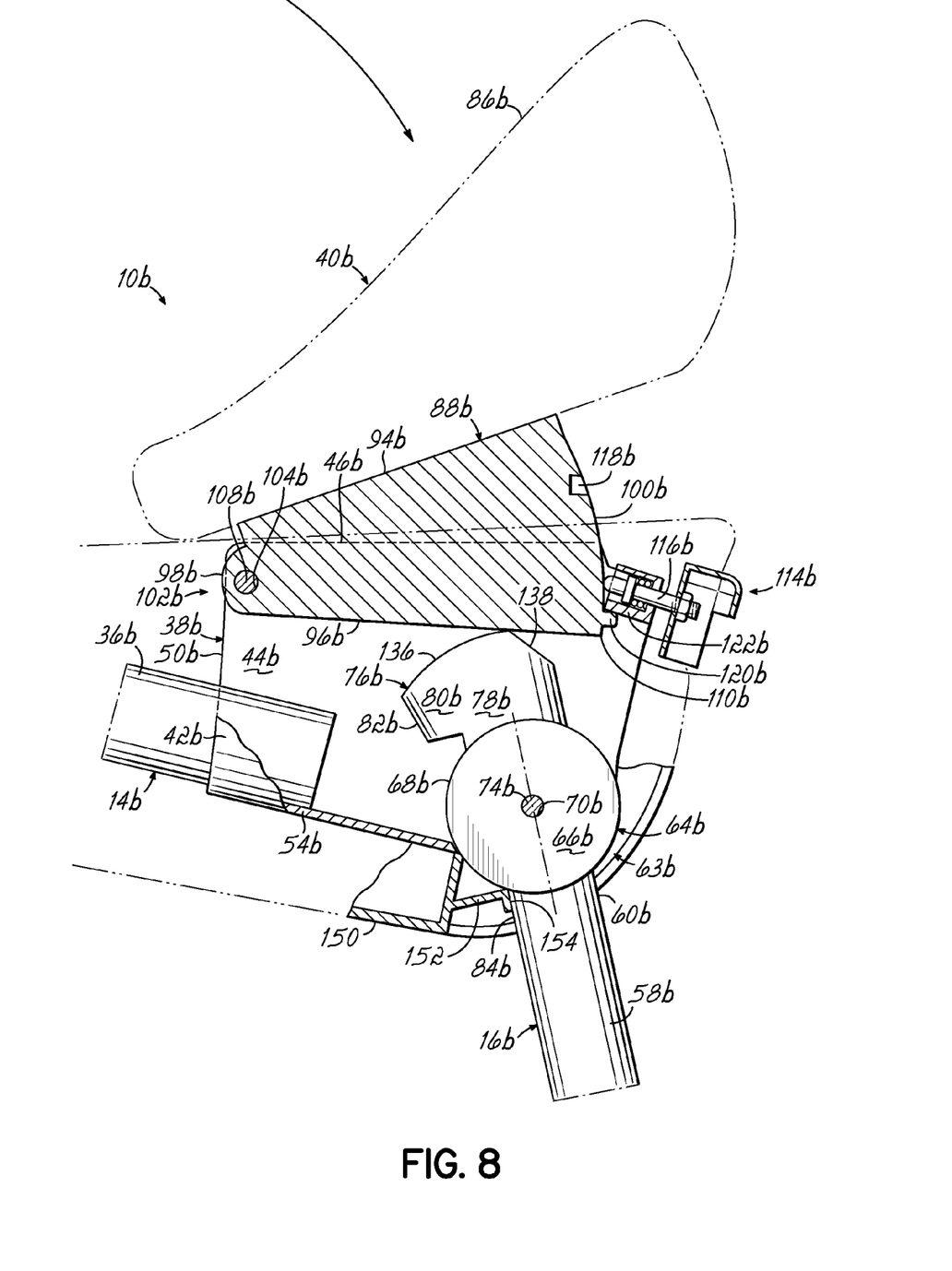
FIG. 8 is a partial cross-sectional view of the seat actuation mechanism of the tricycle of FIG. 7 when in the folded position.

FIGS. 7 and 8 illustrate a vehicle 10*b*, and more specifically a tricycle 10*b*, in accordance with another alternative embodiment. The embodiment shown in FIGS. 7 and 8 operates similar to that shown in FIGS. 1-4 and thus the description will primarily focus on the differences in the two embodiments. In FIGS. 7 and 8 features similar to that shown in FIGS. 1-4 have been identified with similar reference numbers, but suffixed with a b. As shown in these figures and similar to that shown in FIGS. 5 and 6, tricycle 10*b* includes a manifold 150 generally disposed about the middle frame 14*b* that encloses much of the seat actuation mechanism 38*b*.

Similar to the above, one primary difference between this embodiment and that shown in FIGS. 1-4 includes the limit mechanism that limits relative rotation between the middle and rear frame members 14b, 16b. In the embodiment shown in FIGS. 7 and 8, the first abutment surface 82b defined by the end of the second leg portion 80b of the extension portion 76b contacts the inner surface of the lower end wall 54b such that any further rotation of the rear frame 16b relative to the middle frame 14b about the pivot axis in the counterclockwise direction is prohibited. However, when the tricycle 10b is in the folded position, another mechanism limits the relative movement. In this regard, and as illustrated in FIG. 8, the manifold 150 includes a stop clip 152 that defines a stop surface 154. When the tricycle 10b is in the folded position, the stop surface 154 defined by the stop clip 152 contacts a portion of the rear frame 16b (such as one of the frame support elements 58b, e.g., middle portion 60b, wherein that portion defines the second abutment surface 84b), such that any further rotation of the rear frame 16b relative to the middle frame 14b about the pivot axis in the clockwise direction is prohibited.

Additionally, the extension portion 76b may be similar to extension portion 76a shown in FIGS. 5 and 6, and the mount 88b may be similar to the mount 88a shown in FIGS. 5 and 6. Moreover, there may be an additional limit mechanism to limit the relative rotation between the middle frame 14b and the seat assembly 40b. In this regard, the mount 88b of the seat assembly 40b may include one or more tabs 120b extending from the rear wall 100b thereof and configured to engage a ledge 122b of the seat actuation mechanism 38b or manifold 150 to limit counterclockwise rotation of the seat assembly 40b relative to the middle frame 14b. In an exemplary embodiment, the stop surface 154 of the stop clip 152 is configured to engage the second abutment surface 84b of the rear frame 16b simultaneous with or prior to the tabs 120b engaging the ledge 122b.

Figure 9:
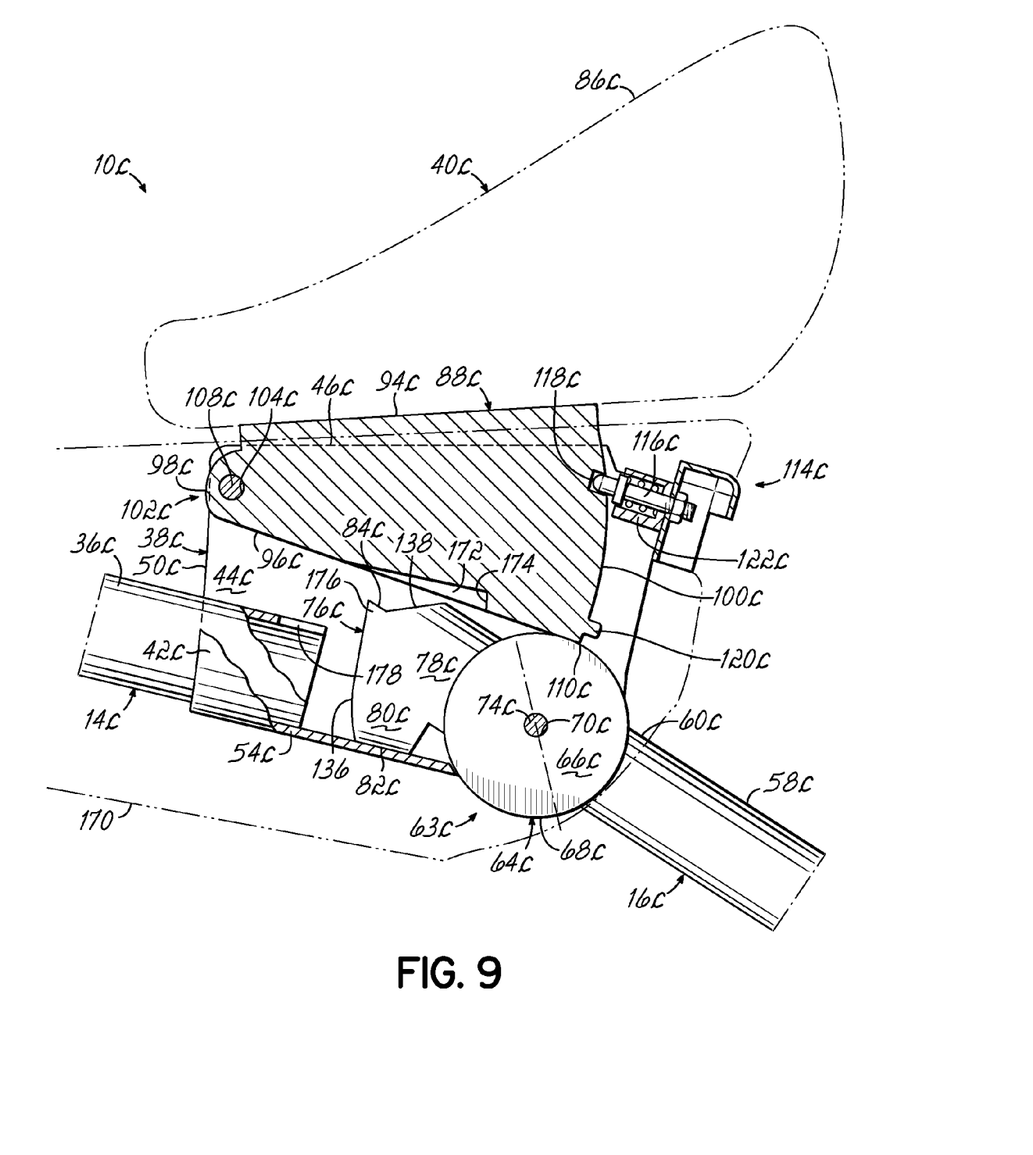
FIG. 9 is a partial cross-sectional view of a seat actuation mechanism of a tricycle when in the extended position according to yet another alternative embodiment.
Figure 10:
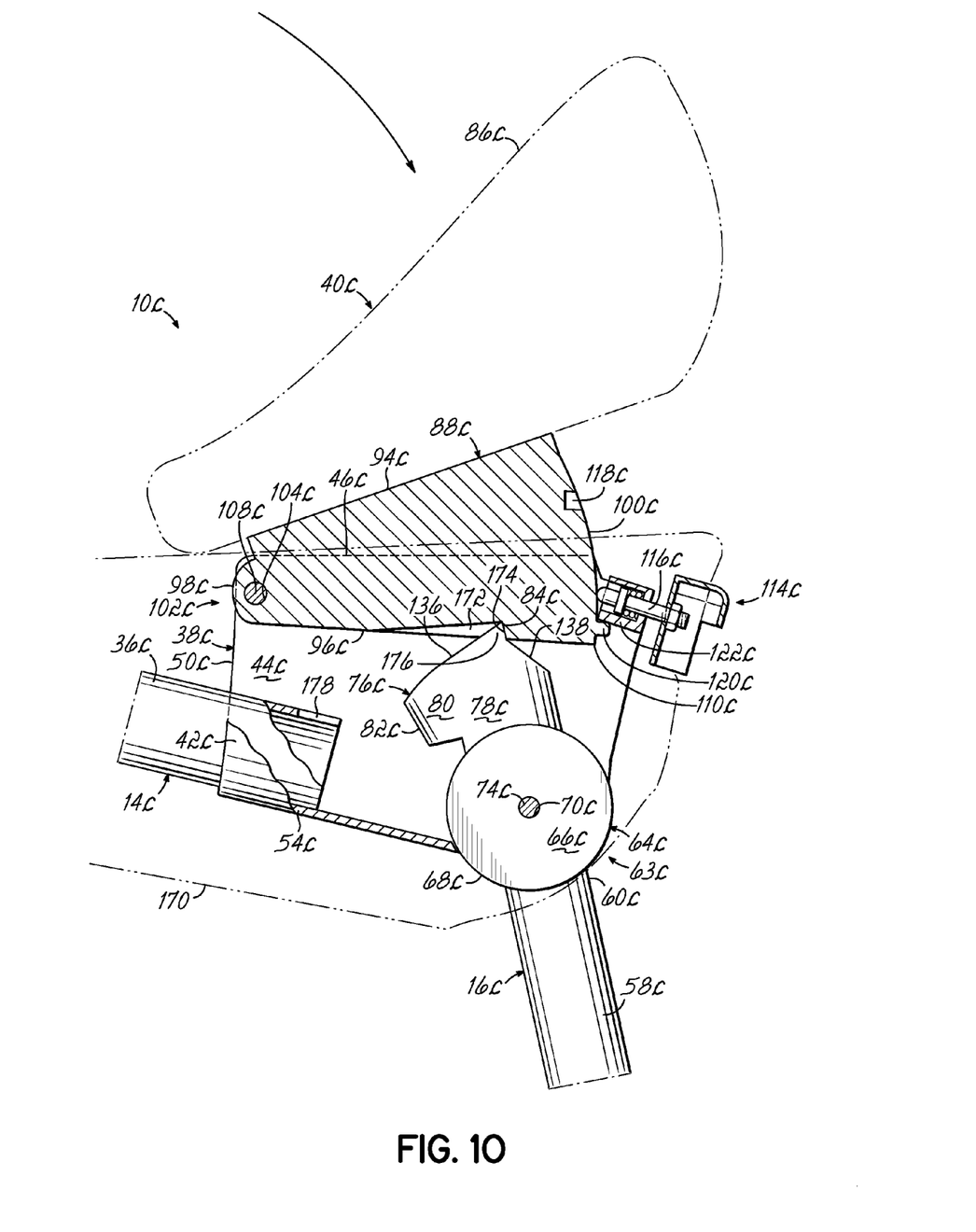
FIG. 10 is a partial cross-sectional view of the seat actuation mechanism of the tricycle of FIG. 9 when in the folded position.

FIGS. 9 and 10 illustrate a vehicle 10c, and more specifically a tricycle 10c, in accordance with yet another alternative embodiment. The embodiment shown in FIGS. 9 and 10 operates similar to that shown in FIGS. 1-4 and thus the description will primarily focus on the differences in the two embodiments. In FIGS. 9 and 10, features similar to that shown in FIGS. 1-4 have been identified with similar reference numbers, but suffixed with a c. As shown in these figures and similar to that shown in FIGS. 5-8, tricycle 10c includes a manifold 170 generally disposed about the middle frame 14c that encloses much of the seat actuation mechanism 38c.

Again, one primary difference between this embodiment and that shown in FIGS. 1-4 includes the limit mechanism that limits relative rotation between the middle and rear frame members 14c, 16c. In the embodiment shown in FIGS. 9 and 10, the first abutment surface 82c defined by the end of the second leg portion 80c of the extension portion 76c contacts the inner surface of the lower end wall 54c such that any further rotation of the rear frame 16c relative to the middle frame 14c about the pivot axis in the counterclockwise direction is prohibited. However, when the tricycle 10c is in the folded position, another mechanism limits the relative movement. In this regard, and as illustrated in FIG. 10, the extension portion 76c defines a second abutment surface 84c. Unlike the previous embodiments, however, the second abutment surface 84c is configured to engage a portion of the seat assembly 40c so as to limit rotational movement of the rear frame 16c relative to the middle frame 14c. More particularly, the mount 88c of the seat assembly 40c includes a triangular-shaped groove 172 in the lower wall 96c that defines a stop surface 174. When the tricycle 10c is in the folded position, the second abutment surface 84c defined by the extension portion 76c enters the groove 172 and contacts the stop surface 174 such that any further rotation of the rear frame 16c relative to the middle frame 14c about the pivot axis in the clockwise direction is prohibited.

Another difference is that the shape of the extension portion 76c may be slightly different to achieve the desired behavior. For example, as illustrated in these figures, the outer surface of the extension portion 76c may include a wedge portion 176 that defines the second abutment surface 84c. Depending on the specific application and the proportions of the tricycle 10c, to accommodate the wedge portion 176 when the tricycle 10c is in the extended position, the support element 36c to which the seat actuation mechanism 38c is coupled may include a cut out 178 that is configured to receive the wedge portion 176 therein when in the extended position. Similar to the previous embodiment, there may be an additional limit mechanism to limit the relative rotation between the middle frame 14c and the seat assembly 40c. In this regard, the mount 88c of the seat assembly 40c may include one or more tabs 120c extending from the rear wall 100c thereof and configured to engage a ledge 122c of the seat actuation mechanism 38c or manifold 170 to limit counterclockwise rotation of the seat assembly 38c relative to the middle frame 14c. In an exemplary embodiment, the second abutment surface 84c of the wedge portion 176 is configured to engage the stop surface 174 of the groove 172 in mount 88c simultaneous with or prior to the tabs 120c engaging the ledge 122c.

Figure 11:
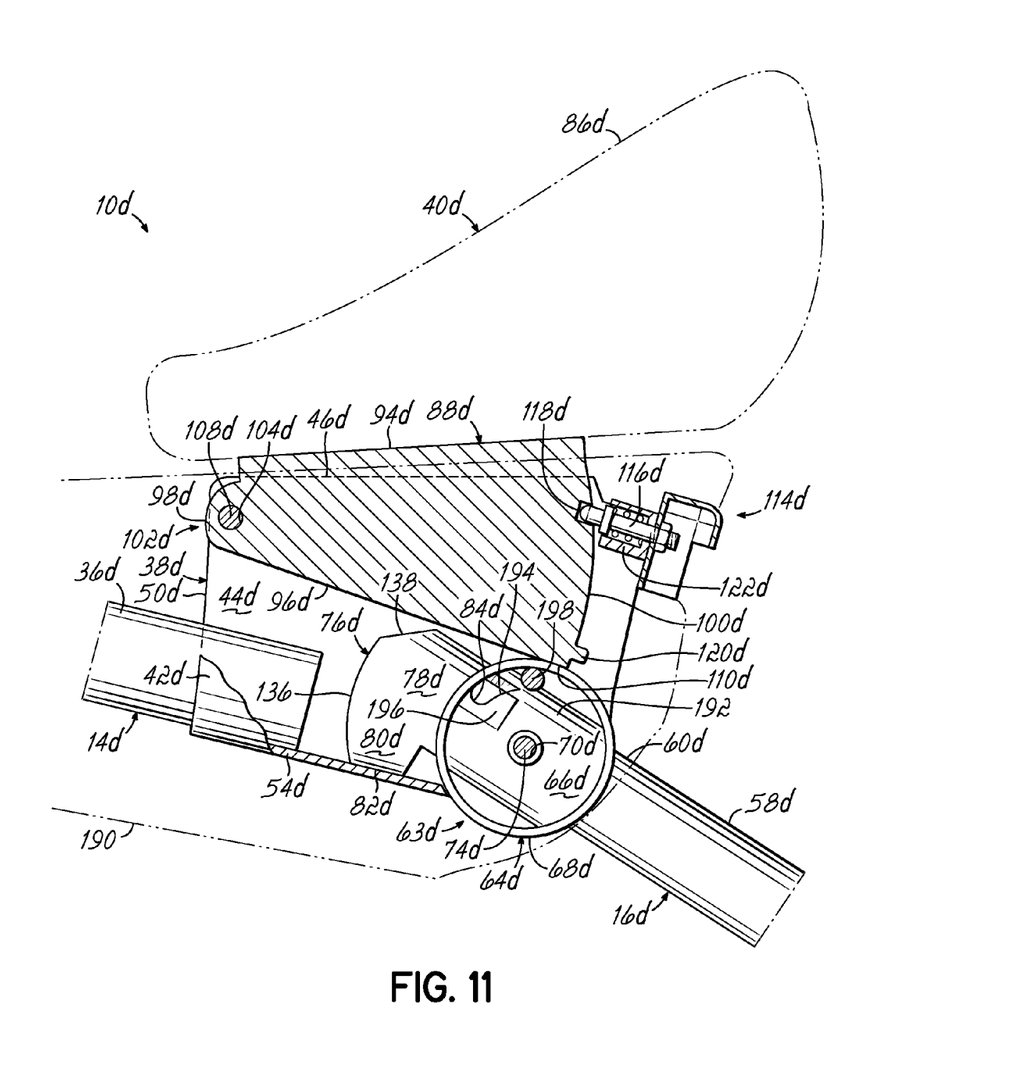
FIG. 11 is a partial cross-sectional view of a seat actuation mechanism of a tricycle when in the extended position according to still another alternative embodiment.
Figure 12:
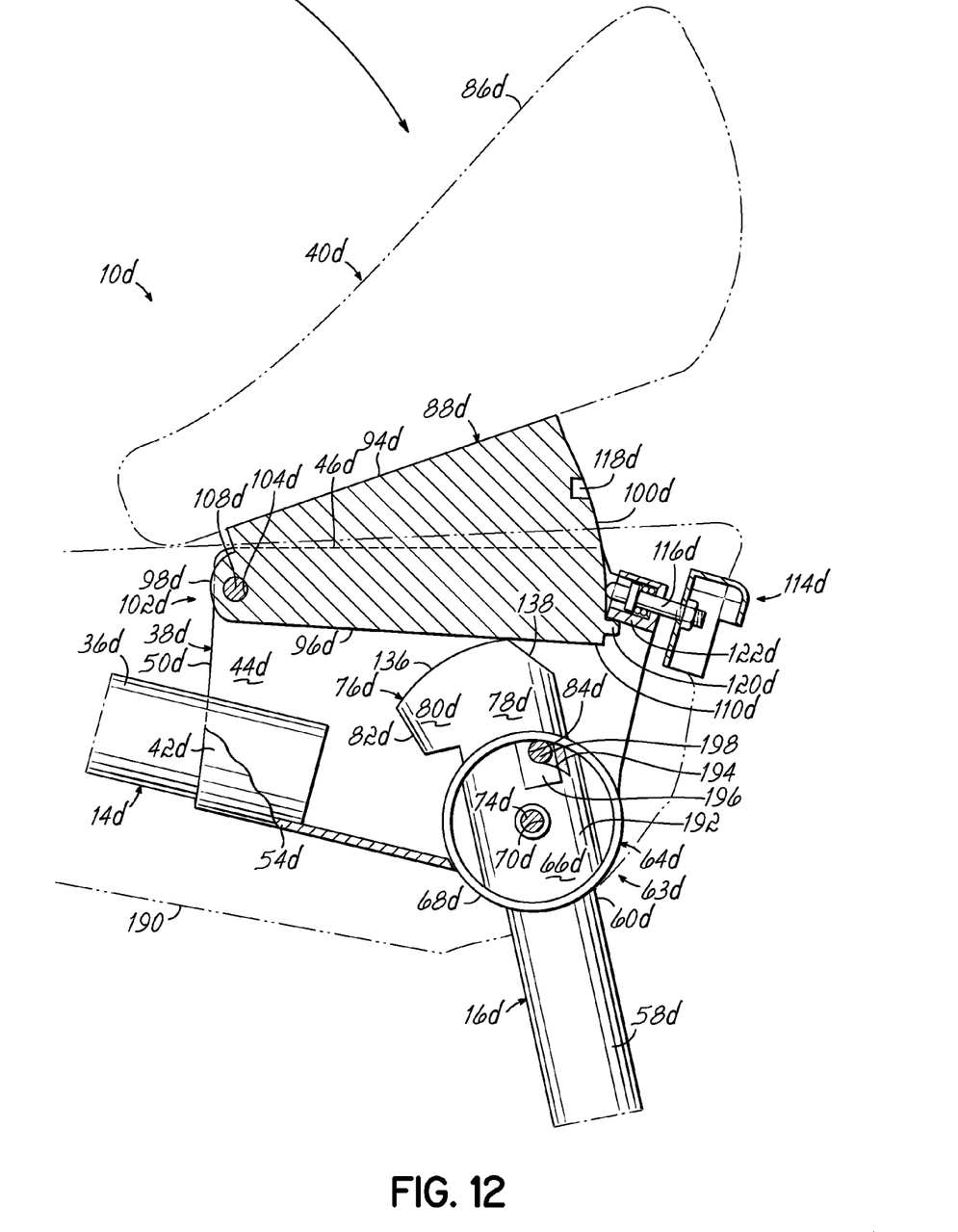
FIG. 12 is a partial cross-sectional view of the seat actuation mechanism of the tricycle of FIG. 11 when in the folded position.

FIGS. 11 and 12 illustrate a vehicle 10d, and more specifically a tricycle 10d, in accordance with yet another alternative embodiment. The embodiment shown in FIGS. 11 and 12 operates similar to that shown in FIGS. 1-4 and thus the description will primarily focus on the differences in the two embodiments. In FIGS. 11 and 12, features similar to that shown in FIGS. 1-4 have been identified with similar reference numbers, but suffixed with a d. As shown in these figures and similar to that shown in FIGS. 5-8, tricycle 10d includes a manifold 190 generally disposed about the middle frame 14d that encloses much of the seat actuation mechanism 38d.

Similar to the above, one primary difference between this embodiment and that shown in FIGS. 1-4 includes the limit mechanism that limits relative rotation between the middle and rear frame members 14d, 16d. In the embodiment shown in FIGS. 11 and 12, the first abutment surface 82d defined by the end of the second leg portion 80d of the extension portion 76d contacts the inner surface of the lower end wall 54d such that any further rotation of the rear frame 16d relative to the middle frame 14d about the pivot axis in the counterclockwise direction is prohibited. However, when the tricycle 10d is in the folded position, another mechanism limits the relative movement. In this regard, and as illustrated in FIG. 12, the cylindrical disc 64d, and more particularly an interior member 192 thereof, includes a groove or notch 194 that defines a second abutment surface 84d. A boss or bushing 196 may be provided adjacent the notch 194 to provide added strength. Additionally, the notch 194 may have a generally arcuate configuration to accommodate the rotational nature of the cylindrical disc 64d. Furthermore, the seat actuation mechanism 38d includes a pin 198, such as for example a screw, received within a bore (not shown) in at least one of the plate members 42d, 44d (42d shown in FIGS. 11 and 12). The bore is located such that when the pin 198 is located therein, the pin 198 projects into the interior of the cylindrical disc 64d. In this way, when the tricycle 10d is in the folded position, the second abutment surface 84d defined by the notch 194 in the interior member 192 of the cylindrical disc 64d contacts the pin 198 such that any further rotation of the rear frame 16d relative to the middle frame 14d about the pivot axis in the clockwise direction is prohibited.

Additionally, the extension portion 76d may be similar to extension portion 76a shown in FIGS. 5 and 6, and the mount 88d may be similar to the mount 88a shown in FIGS. 5 and 6. Moreover, there may be an additional limit mechanism to limit the relative rotation between the middle frame 14d and the seat assembly 40d. In this regard, the mount 88d of the seat assembly 40d may include one or more tabs 120d extending from the rear wall 100d thereof and configured to engage a ledge 122d of the seat actuation mechanism 38d or manifold 190 to limit counterclockwise rotation of the seat assembly 40d relative to the middle frame 14d. In an exemplary embodiment, the pin 198 is configured to engage the second abutment surface 84d simultaneous with or prior to the tabs 120d engaging the ledge 122d.

While the present invention has been illustrated by a description of various preferred embodiments and while these embodiments have been described in some detail, it is not the intention of the inventors to restrict or in any way limit the scope of the appended claims to such detail. Additional advantages and modifications will readily appear to those skilled in the art. Thus, the various features of the invention may be used alone or in any combination depending on the needs and preferences of the user.

What is claimed is:

1. A foldable tricycle, comprising:
   a first frame having a steering assembly with a front wheel and a handlebar;
   a second frame having a longitudinal axis, opposite ends and a pair of rear wheels on one of the ends of the second frame;
   a seat assembly having a seat and a mount fixedly secured to the seat;
   a first pivot pin defining a first pivot axis and providing pivotal movement of the first and second frames relative to one another between an extended position and a folded position, the first pivot pin located between the ends of the second frame; and
   a second pivot pin defining a second pivot axis and providing pivotal movement of the first frame and the seat assembly relative to one another,
   wherein when the first and second frames are in the folded position, downward force applied on the seat assembly causes pivotal movement of the seat assembly relative to the first frame and causes the seat assembly to contact the other one of the ends of the second frame at a contact point and force pivotal movement of the second frame relative to the first frame thus moving the first and second frames from the folded position to the extended position,
   wherein a distance from the second pivot axis to the contact point is less than a distance from the second pivot axis to the first pivot axis,
   wherein an axis passing through the first and second pivot axes forms an angle with the longitudinal axis of the second frame when the first and second frames are in the folded position, and
   wherein an axis passing through the contact point and the first pivot axis is substantially aligned with the longitudinal axis of the second frame when the first and second frames are in the folded position.

2. The foldable tricycle according to claim 1, wherein rotation of the seat assembly relative to the first frame in a first rotational direction causes rotation of the second frame relative to the first frame in a second rotational direction opposite to the first rotational direction.

3. The foldable tricycle according to claim 1, wherein when the first and second frames are in the folded position, the seat is angled forward to discourage a rider from sitting in the seat.

4. The foldable tricycle according to claim 1, further comprising a lock mechanism to fix an orientation of the first frame relative to the second frame when the first and second frames are in the extended position.

5. The foldable tricycle according to claim 1, wherein the second frame engages the seat assembly through abutting contact.

* * * * *